United States Patent
Sadowski (10) Patent No.: US 11,030,135 B2
(45) Date of Patent: *Jun. 8, 2021

(54) METHOD AND APPARATUS FOR POWER REDUCTION FOR DATA MOVEMENT

(71) Applicant: Advanced Micro Devices, Inc., Santa Clara, CA (US)

(72) Inventor: Greg Sadowski, Cambridge, MA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 7 days.

This patent is subject to a terminal disclaimer.

(21) Appl. No.: 16/212,930

(22) Filed: Dec. 7, 2018

(65) Prior Publication Data

US 2019/0108154 A1  Apr. 11, 2019

Related U.S. Application Data

(63) Continuation of application No. 13/721,441, filed on Dec. 20, 2012, now Pat. No. 10,191,873.

(51) Int. Cl.
*G06F 12/00* (2006.01)
*G06F 13/38* (2006.01)
*G06F 3/06* (2006.01)
*G06F 12/02* (2006.01)

(52) U.S. Cl.
CPC .......... *G06F 13/385* (2013.01); *G06F 3/0619* (2013.01); *G06F 12/0246* (2013.01); *Y02D 10/00* (2018.01)

(58) Field of Classification Search
CPC .. G06F 12/0246; G06F 3/0619; G06F 13/385; Y02D 10/14; Y02D 10/151
See application file for complete search history.

(56) References Cited

U.S. PATENT DOCUMENTS

| | | | | |
|---|---|---|---|---|
| 6,415,380 | B1* | 7/2002 | Sato | G06F 9/3834 |
| | | | | 711/137 |
| 6,647,200 | B1* | 11/2003 | Tanaka | G08B 13/19604 |
| | | | | 348/E7.086 |
| 9,058,268 | B1* | 6/2015 | Ostiguy | G06F 12/1009 |
| 10,593,380 | B1* | 3/2020 | Volpe | G06F 11/3037 |
| 2002/0174321 | A1* | 11/2002 | John | G06F 9/384 |
| | | | | 712/218 |
| 2004/0141486 | A1* | 7/2004 | Suri | H04L 49/9047 |
| | | | | 370/338 |

(Continued)

OTHER PUBLICATIONS

U.S. Appl. No. 13/721,411; Non-Final Office Action; dated Nov. 6, 2015.

(Continued)

*Primary Examiner* — Prasith Thammavong
(74) *Attorney, Agent, or Firm* — Faegre Drinker Biddle & Reath LLP (57) ABSTRACT

A method of and device for transferring data is provided. The method includes determining a difference between a data segment that was transferred last relative to each of one or more data segments available to be transferred next. In some embodiments, for so long as no data segment available to be sent has been waiting too long, the data segment chosen to be sent next is the data segment having the smallest difference relative to the data segment transferred last. The chosen data segment is then transmitted as the next data segment transferred.

15 Claims, 6 Drawing Sheets

(56) References Cited

U.S. PATENT DOCUMENTS

| | | | |
|---|---|---|---|
| 2004/0186945 A1* | 9/2004 | Jeter, Jr. | G06F 11/2087 |
| | | | 711/5 |
| 2005/0289301 A1* | 12/2005 | Woo | G06F 13/1642 |
| | | | 711/137 |
| 2007/0234014 A1* | 10/2007 | Kobayashi | G06F 9/3828 |
| | | | 712/220 |
| 2008/0072015 A1* | 3/2008 | Julier | G06F 1/3203 |
| | | | 712/202 |
| 2008/0294820 A1 | 11/2008 | Croxford | |
| 2009/0147882 A1* | 6/2009 | Rha | H04L 25/4915 |
| | | | 375/295 |
| 2014/0181386 A1 | 6/2014 | Sadowski | |
| 2014/0281367 A1* | 9/2014 | Johnson | G06F 5/10 |
| | | | 711/218 |
| 2016/0117118 A1* | 4/2016 | Mart Nez | G06F 3/0611 |
| | | | 711/162 |
| 2017/0371673 A1* | 12/2017 | Fei | G06F 9/30098 |
| 2019/0235876 A1* | 8/2019 | Fei | G06F 9/3836 |

OTHER PUBLICATIONS

U.S. Appl. No. 13/721,441; Final Office Action; dated Jun. 6, 2016.
U.S. Appl. No. 13/721,441; Non-Final Office Action; dated Dec. 1, 2016.
U.S. Appl. No. 13/721,441; Final Office Action; dated Jun. 16, 2017.
U.S. Appl. No. 13/721,441; Non-Final Office Action; dated Feb. 8, 2018.

* cited by examiner

METHOD AND APPARATUS FOR POWER REDUCTION FOR DATA MOVEMENT

RELATED CO-PENDING APPLICATION

This application is a continuation of application Ser. No. 13/721,441, filed on Dec. 20, 2012, having inventor Greg Sadowski, titled "METHOD AND APPARATUS FOR POWER REDUCTION FOR DATA MOVEMENT" which is incorporated herein by reference.

FIELD OF THE DISCLOSURE

The present disclosure is related to methods and devices for providing data movement. The present disclosure is related more specifically to methods and devices for providing data movement between buffers so as to reduce the power needed therefor.

BACKGROUND

Processing often includes the movement of data. Such data movement often occurs between elements having data storage, both permanent and temporary. Such movement can be within a processor, between processors with onboard (on-chip) storage, between a processor and memory not located on-chip (such as off-chip DRAM), or otherwise. These transfers happen over a "bus" which is a subsystem that transfers data between components. Busses have "widths" that define how many bits of data can be sent at a time. Common bus widths provide for 16, 32, and 64 bits (powers of 2 generally, although other sizes can and have been used) to be communicated in a single clock pulse. Data to be sent over these busses is thus grouped into 16, 32, or 64 bits, as appropriate. These groupings are referred to as "words."

Regardless of the source and destination of the transfer, such transfers require power. For many of the transfers, the power that is needed is directly related to the number of bits that need to be toggled between successively transmitted data words. Values to be sent across a bus are often established in a register that receives a clock signal. The clock signal then causes the register to output its current state as the transmitted word. Many transmission registers include the use of capacitors. Changing a bit value in the register often involves at least partial discharge of energy from a respective capacitor. That capacitor subsequently needs to be recharged, thereby drawing power. Thus, reduced bit toggling results in reduced power consumption.

Data transfer is often performed using first-in, first-out (FIFO) buffers at the transmission end and reception end. Thus, words are transmitted in the order that they are received and differences between successive words thus cause toggling and power draws.

To lessen the amount of bit toggling, concepts such as bus inversion and signal change encoding have been developed. Bus inversion causes a bit to be provided that indicates that a sent data word is actually the opposite of what is intended. Thus, the receiving entity knows to actually write the opposite value for each received bit. For any data word where greater than 50% of the bits change relative to the previously sent data word, data inversion likely reduces the toggling required.

Similarly, the concept of signal encoding operates to lessen the toggling of bits. For bits that are known to change often, a receiving entity can interpret a high signal ("1") as an instruction to use the inverse of the bit's value in the previously received word. The receiving entity interprets a low signal ("0") as an instruction to reuse the value of the bit from the previous word. Accordingly, for a bit that fluctuates with each clock segment, the communicating bit can remain high on the bus and the receiving entity knows that the proper value is fluctuating with each clock pulse. Again, signal encoding of this type would be expected to provide power savings when the bit is expected to change between successive words over 50% of the time.

Despite these techniques, bit toggling in data busses continues to be a source of power consumption. Accordingly, there exists a need for additional power savings associated with the transfer of data over busses.

DETAILED DESCRIPTION OF EMBODIMENTS

In an exemplary and non-limited embodiment, aspects of the invention are embodied in a method of transferring data. The method includes determining a difference between a data segment that was transferred last relative to each of one or more data segments available to be transferred next. In some embodiments, for so long as no data segment available to be sent has been waiting too long, the data segment chosen to be sent next is the data segment having the smallest difference relative to the data segment transferred last. The chosen data segment is then transmitted as the next data segment transferred.

Briefly, in one example, a device for transferring data is provided including: a data storage having a plurality of entries; a transmitter operable to output entries from the data storage; and a controller operable to determine a difference between each entry in the data storage relative to an entry last output by the transmitter. The transmitter is operable to (in some embodiments only for so long as no entry has been stored within the data storage for a threshold amount of time) identify a second entry that is an entry stored in the data storage having the smallest difference relative to the entry last output by the transmitter, and transmit the second entry as the entry transmitted next after the first entry.

In another example, a method of receiving data is provided including receiving a first data entry, receiving a first index along with the first data entry, and writing the first data entry to a first slot in a first buffer; the first slot being identified by the first index.

In yet another example, a method of transferring data is provided including accessing a first ordered set of data entries in a first data storage; the first ordered set including a first entry and a second entry, the first entry having been written to the first data storage before the second entry was written to the first data storage; transferring the second entry from the first data storage to a second data storage; transferring the first entry from the first data storage to the second data storage after transfer of the second entry from the first data storage to the second data storage, the first entry being transferred after the second entry at least partially due to the similarity between the first and second entries; and outputting the first entry from the second data storage prior to outputting the second entry from the second data storage.

In another example, a method of transferring data is provided including determining a difference between a first piece of transferred data and one or more pieces of data available for transfer; determining a difference between each of the one or more pieces of data available for transfer and the other pieces of the one or more pieces of data available for transfer; and determining an order of transfer for multiple pieces of the data that reduces an amount of power needed to complete the transfer based on the determined differences between the pieces of data available for transfer.

In still another example, a computer readable medium is provided that contains non-transitory instructions thereon, that when interpreted by at least one processor cause the at least one processor to determine a difference between a first piece of transferred data and one or more pieces of data available for transfer; determine a second piece of data, the second piece of data being the piece of data available for transfer having the smallest difference relative to the first piece of transferred data for so long as no piece of data available for transfer achieves an age above a defined threshold; and transmit the second piece of data as the next piece of data of the one or more pieces of data available for transfer that is transferred after transfer of the first piece of data.

In another example, a data storage is provided including a plurality of data storage slots; a controller operable to: receive a first data entry of a set of ordered data entries; receive an index; and place the first data entry into one of the plurality of data storage slots at least partially based on the index. The data storage further includes an output, operable to output data entries, including the first data entry, in an order proscribed by the index.

In yet another example, a method of transferring data is provided comprising transmitting a second data segment after a first data segment, said second data segment being selected from one or more data segments available for transfer based upon the differences between the first data segment and each of the one or more data segments available for transfer.

Figure 1:
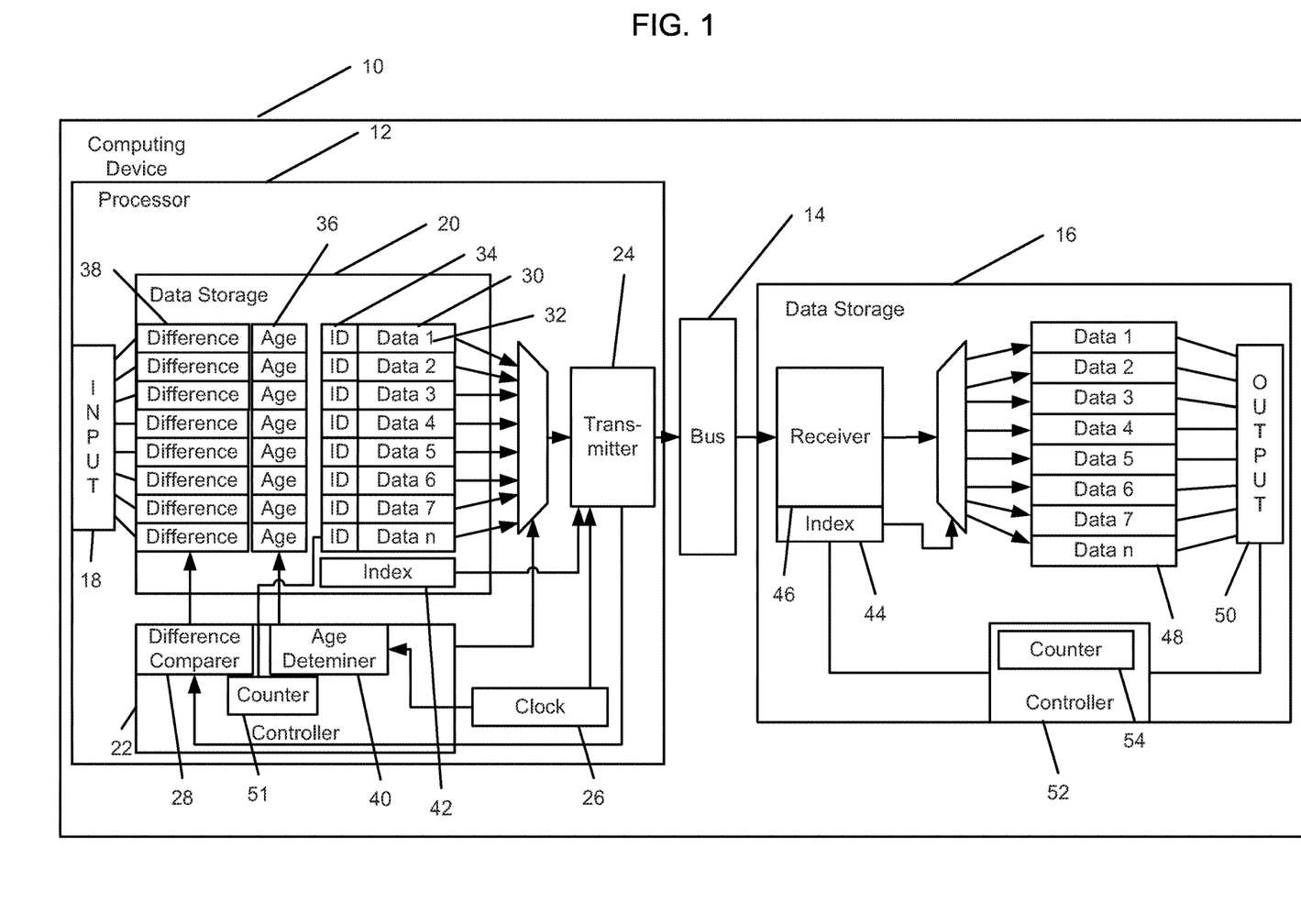
FIG. 1 is a diagram showing exemplary architecture of a system employing bus communications according to an embodiment of the present disclosure.

FIG. 1 shows architecture for providing data transfer by a computing device 10. Computing device 10 includes processor 12, bus 14, and reception data storage 16. Processor 12 includes input 18, source data storage 20, controller 22, transmitter 24, and clock 26.

Input 18 receives data to be transferred and places it in source data storage 20 as instructed by controller 22. Source data storage 20 is illustratively shown as a skid buffer having eight data "slots" 30 (referred to as being a source data storage/buffer 20 that is eight "deep"). However, the lowest illustrated slot 30 is designated as holding "Data n" which is indicative of the fact that showing eight slots 30 is merely exemplary and that embodiments are envisioned utilizing data storages of any depth. Each slot 30 stores a data segment or entry (two or more bits). In the illustrated embodiment, each slot stores the data word itself 32, a unique ID 34 for each word, an age 36 for each word, and a difference value 38 indicative of the difference between the data value and the last data value transmitted by transmitter 24. Each data word 32 is illustratively thirty-two bits long. However, embodiments are envisioned that utilize other word sizes. Indeed, as will become apparent, some of the gains achieved by the methods and devices described herein increase as the word size increases. Furthermore, in the examples put forth in FIGS. 8a-c, words that are sixteen bits long are shown.

Unique ID 34 is a value sufficiently unique to distinguish each data word 32 from all other data words 32 that may simultaneously be stored within source data storage 20 or reception data storage 16. In one embodiment, unique ID 34 is generated by a source (not shown) of data word 32. In another embodiment, unique ID 34 is generated by controller 22 having a counter that counts words as they are input into source data storage 20. In one embodiment, a full counter value is not used as unique ID 34, but rather a couple of the least significant bits of the counter value are used such that all locations in reception data storage 16 are addressable.

Controller 22 is illustratively processor 12 executing instructions. However, embodiments are envisioned where controller 22 takes the form of state logic or other appropriate hardware. Controller 22 has age determiner/calculator 40 operable to calculate age values 36. Age values 36 are indications of how many clock cycles have passed since each respective word 32 was placed into source data storage 20. Embodiments are envisioned where age 36 indicate age using a different reference.

Controller 22 has difference comparer/calculator 28 operable to calculate difference values 38. Difference values 38 provide an indication of a number of bits that must change to switch a register in transmitter 24 from the value currently held therein to the value of the respective slot 30. It should also be appreciated that embodiments are envisioned, as discussed below, where multiple difference values are stored as part of difference value 38. One example of such additional difference values is values indicative of differences between each of the data words 32. By way of example with reference to FIG. 8a, if word0 was the last word 32 transferred, difference values 38 for each of words 1-5 would be 16, 0, 16, 0, 16, respectively. Alternatively, with reference again to FIG. 8a, if bus inversion is available, difference values for each of words 1-5 can be 1, 0, 1, 0, 1 in that only the inversion bit would need to be toggled. In another embodiment, difference values are not numbers, but rather presented in inexact terms such as "large," "medium," and "small."

Source data storage 20 further has index 42 that, via ID's 34 or otherwise, records an order in which data words 32 are received (and thus an order that data words 32 should be output from reception data storage 16). Index 42, or a portion thereof, is provided to transmitter 24 such that a receiving data storage, such as reception data storage 16, is able to properly order words 32. In certain embodiments, ID's 34 themselves act as the index and provide the index function such that a separate index 42 is not necessary.

Bus 14 is sized to be able to transmit each word 32 along with data that provides reception data storage 16 the ability to re-create the proper word order, via re-creation of index 42 as reception index 44, or otherwise.

Reception data storage 16 is illustratively DRAM. Reception data storage 16 includes receiver 46, index 44, skid buffer slots 48, output 50, controller 52, and optionally counter 54. Receiver 46 is shown as integral with reception data storage 16. However, embodiments are envisioned where receiver 46 is separate from and operates on reception data storage 16. Reception data storage 16 is shown as having eight "slots" 48 (or being eight "deep"). However, like slots 30, this number is exemplary and not intended to be limiting. Indeed, having reception data storage 16 with increased depth also increases the effectiveness of the method and devices described herein. As a practical matter, the depth of reception data storage 16 is bigger than or equal to the depth of source data storage 20. Data words 32 are placed within slots 48 by receiver 46 as instructed by the information in index 44. Output 50 subsequently and sequentially outputs data words from slots 48. Controller 52 is provided as state logic operable to perform operations described below.

While the above description of the components discussed some of the functionality thereof, discussion will now be turned to the operation of the components in more detail.

Overall, data fidelity is maintained by providing that data input at input 18 in a certain order also be output from output 50 in that same order. In the past, this has been achieved by having source data storage 20 and reception data storage 16 be a FIFO buffers that process and transmit data words in the order that they are received. However, as noted, maintaining the order of data words 32 during processing and transfer is not necessary so long as the words 32 are output from output 50 in the proper order. Accordingly, the present disclosure allows transmission of data words 32 "out of order" to achieve power savings.

Data words 32 for transfer are received at input 18 and are subsequently placed in slots 30. Each time a data word 32 is transmitted (block 200 of FIG. 2) another data word 32 is able to be loaded into the spot vacated by the transmitted data word 32 (block 210). Each data word 32 is stored with unique ID 34. Unique ID 34 is a sequential number of the associated data word 32. Unique ID 34 is either generated external to source data storage 20 by the data source or otherwise, or is generated at the source data storage 20 by a counter 51 that counts data words 32 as they arrive from the data source. In one embodiment, a minimal number of bits are used for Unique ID 34 to provide just enough specificity to address every slot 48 of reception data storage 16. In this embodiment, the unique ID 32 bits are the indexes 42, 44 (thus, a separate index is not required). In such embodiments, the creation of the unique ID for any new data words 32 constitutes updating the index 42 of the source data storage 20 (data buffer), block 220. In other embodiments, index 42 is separately stored data that is likewise updated, block 220.

Figures 2, 3:
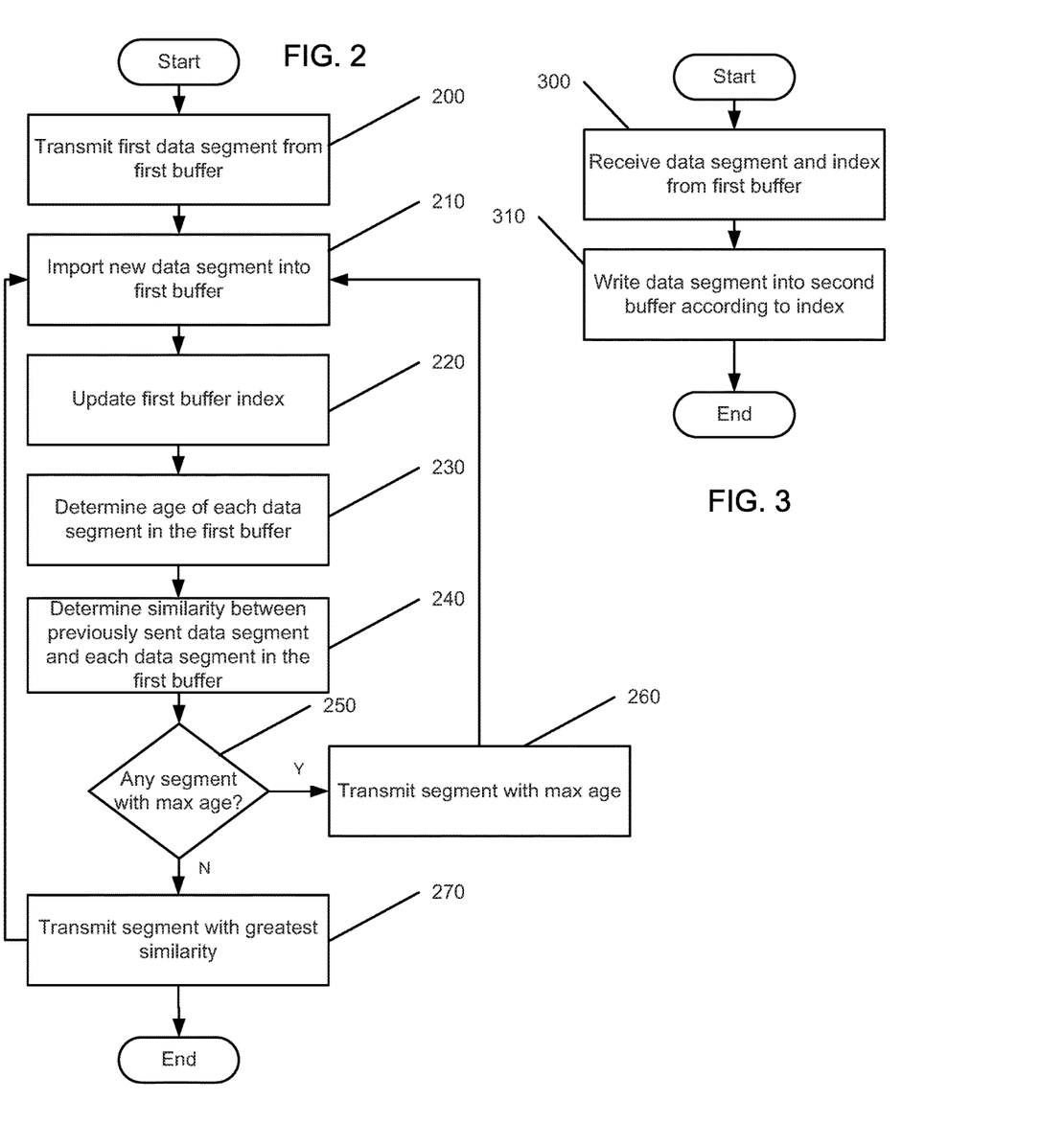
FIG. 2 is a flowchart showing a first embodiment of operation of bus communications according to an embodiment of the present disclosure.
FIG. 3 is a flowchart showing an embodiment of operation of data reception in accordance with an embodiment of the present disclosure.

For each data word 32, age determiner 40 calculates an associated age 36, block 230. In one embodiment, age is calculated according to a number of pulses of clock 26 that have occurred since arrival of that data word 32. Controller 22 also calculates or is provided a maximum allowable age value. The maximum allowable age is indicative of the longest amount of time that a data word 32 can remain un-transmitted without causing a disruption in the ordered output at output 50. While embodiments are envisioned where output 50 waits on certain data words 32, there is still a maximum time that output 50 can wait and such maximum wait is factored into the maximum allowable age.

Similarly, for each data word 32, difference comparer 28 calculates a difference 38 between the data word 32 and the current state of the output register in transmitter 24, block 240. As previously noted, difference 38 is indicative of the power needed to change transmitter 24 from its current condition to a condition ready to transmit the respective data word 32. More specifically, difference 38 is indicative of a number of bits that have to change to place data word 32 into the transmission register. The current state of the transmission register of transmitter 24 is going to be indicative of a rest state of the register or the values of a previously sent data word.

With the ages 36 and differences 38 calculated, controller 22 then identifies the word 32 to be sent from those available to be sent (those in slots 30). The first inquiry is to determine if any data word 32 has aged to the maximum allowable age, block 250. If there is a data word 32 of maximum age, then that data word 32 is placed by controller 22 in transmitter 24, block 260. Again, a data word 32 reaching maximum age is indicative of the fact that the data word 32 must be sent to preserve data fidelity and timeliness at output 50.

If no data word 32 has reached maximum age, then the data word 32 with the smallest difference value (the greatest similarity) is placed by controller 22 in transmitter 24, block 270. It should be appreciated that embodiments are envisioned where the determination of similarity is done after the determination of whether a data word 32 having max age exists in that the difference value is used after it is determined that no data word 32 with max age exists.

Figure 4:
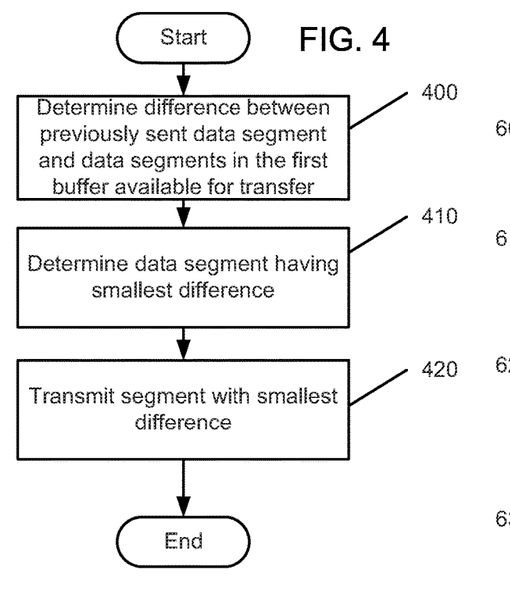
FIG. 4 is a flowchart showing an embodiment of operation of data transmission in accordance with an embodiment of the present disclosure.

The embodiment in abbreviated form includes 1) determining the difference between each data word 32 and the current status of the transmission register (the previously sent data word), block 400 of FIG. 4; 2) determining which of the data words 32 presents the smallest difference, block 410, and 3) transmitting that data word 32 having the smallest difference, block 420.

Computer simulations of the transmission protocol generally shown in FIG. 2 have been created and run. Simulations provided bus widths of 320, 464, and >2,000 bits and then varied the size (depth) of data storage 20. A toggle rate provided by the use of prior art FIFO buffers is shown as the "Base Toggle Rate." Generally, increasing the depth of data storage 20 reduces the toggle rate and increases the toggle savings. Furthermore, an increase in the bus width magnifies the savings in toggle reduction seen from the increase in the depth of data storage 20. Further results are shown below in Table 1.

TABLE 1

Base Toggles Rates and Changes for Various Transmission Data Storage Depths

| Bus Width | Base Toggle Rate | Depth = 4 | | Depth = 8 | | Depth = 16 | | Depth = 512 | |
|---|---|---|---|---|---|---|---|---|---|
| | | Rate | Savings | Rate | Savings | Rate | Savings | Rate | Savings |
| 320 | 17.85% | 17.71% | 7.79% | 15.83% | 11.32% | 15.34% | 14.06% | 14.59% | 18.26% |
| 464 | 15.04% | 12.53% | 16.72% | 10.47% | 30.39% | 8.00% | 46.83% | 3.98% | 73.56% |
| >2k | 23.73% | 13.23% | 44.24% | 9.82% | 58.60% | 7.80% | 67.11% | | |

Figure 7:
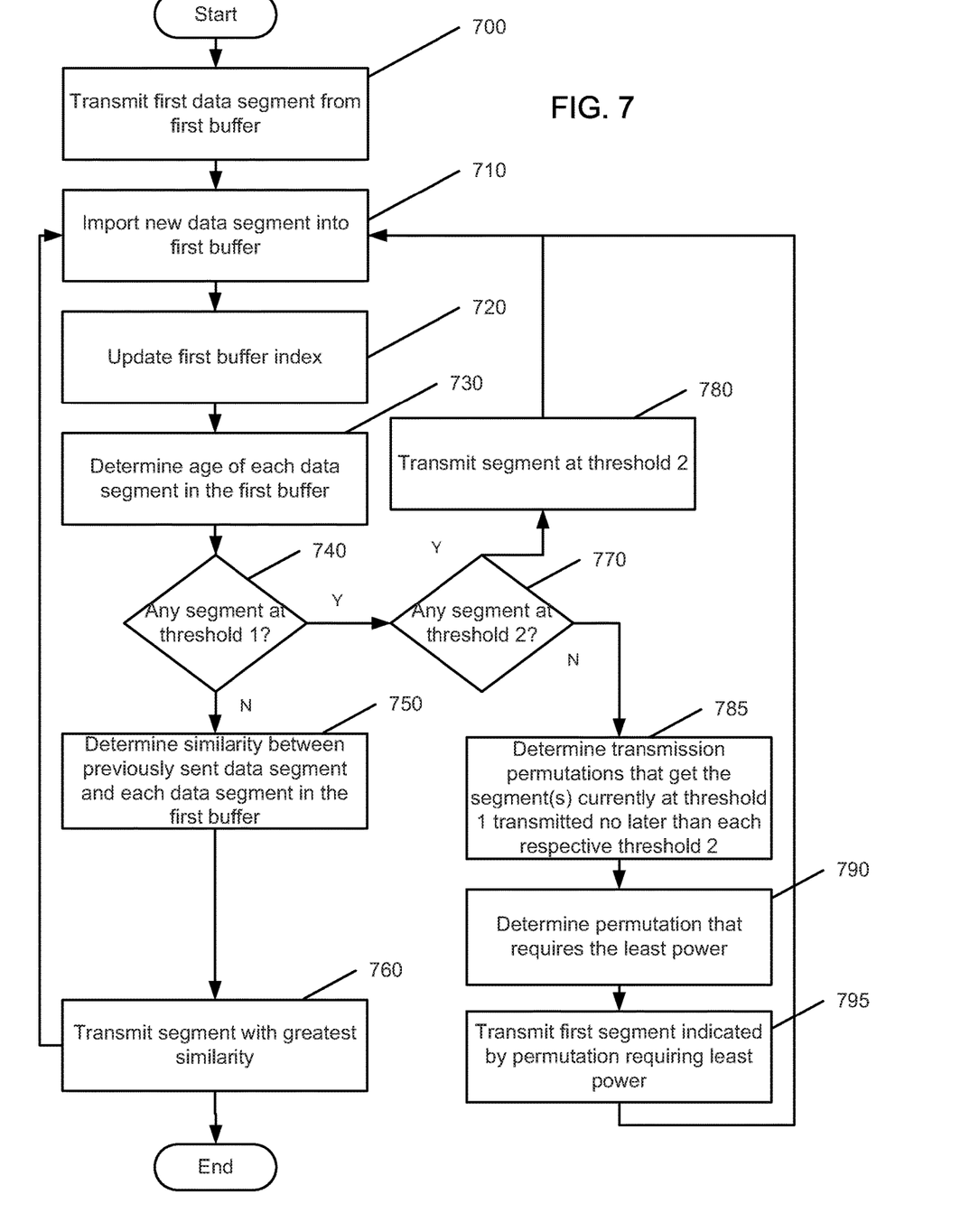
FIG. 7 is a flowchart showing a second embodiment of operation of bus communications according to an embodiment of the present disclosure.

In another embodiment, shown in FIG. 7, a second embodiment operation of controller 22 is provided. Like the embodiment of FIG. 2, each time a data word 32 is transmitted (block 700) another data word 32 is able to be loaded into the spot vacated by the transmitted data word 32 (block 710). Index 42 is then updated, either via receipt of a new unique ID 34 for any new data words 32 or alteration of a separate index 42, block 720. For each data word 32, age determiner 40 calculates an associated age 36, block 730. Controller 22 calculates or is provided a maximum allowable age value. Controller 22 also calculates or is provided a first threshold value. In one embodiment the first threshold is a value indicative of being 75% of the way to the maximum age value. Stated differently, the first threshold is indicative that a data word 32 is approaching maximum age. Controller 22 then determines if any data word 32 has an age equal to or exceeding the first threshold, block 740. If no data word 32 has an age equal to or exceeding the first threshold then controller 22 proceeds as described in the previous embodiment by determining the similarity/difference between the data words 32 and the setting of the transmission register (which is often indicative of the last word sent), block 750. The data word with the greatest similarity (smallest difference) is then transmitted, block 760.

If a data word 32 has achieved an age equal to or exceeding the first threshold, then controller 22 determines if any data words 32 with an age above the first threshold are also at the max age (a second threshold), block 770. As in the previous embodiment, if a data word 32 is at the max age threshold, then it is immediately sent as the next data word 32 transmitted, block 780.

If none of the data words above the first threshold are at the max age, then controller 22 determines all transmission permutations (orders of transmission of data words) that result in the data words above the first threshold being transmitted by the time the data words 32 will reach their maximum age, block 785. It should be appreciated that the first threshold can be set sufficiently high to reduce the calculation burden imposed hereby. Indeed, a higher first threshold reduces the number of iterations available before the identified data word 32 reaches the maximum age.

From the determined permutations, controller 22 determines which permutation requires the least amount of energy to complete, block 790. The chosen permutation is likely that which involves the fewest bit toggles. The determined lowest power permutation is illustratively an ordered list of data words 32. The first data word 32 in the determined lowest power permutation is then transmitted, block 795. Once a data word 32 is transmitted, via any of blocks 760, 780, and 795, controller 22 calls for importation of a new data segment into source data storage 20, block 710.

Figure 5:
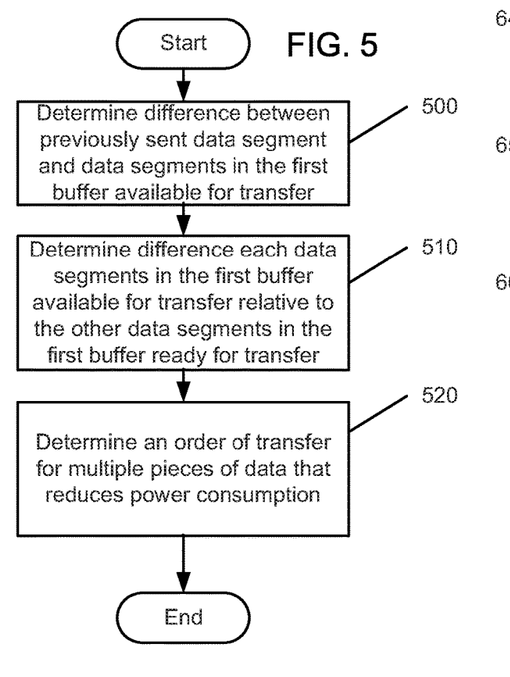
FIG. 5 is a flowchart showing another embodiment of operation of data transmission in accordance with an embodiment of the present disclosure.

The process of determining the permutations includes multiple parts. A determination is made of the difference between the status of the transmission register (indicative of the previously sent data word 32) and each data word 32 available for transfer, block 500 of FIG. 5. A determination is then made of the difference between each data word 32 and every other data word 32, block 510. Permutations (orders) of transmission for the data words 32 are then determined along with the power consumption of each permutation. A permutation (order) is then determined that reduces, or minimizes, the power needed while achieving transmission of words 32 before expiration of the maximum times, block 520.

On the other end, receiver 46 receives transmitted data words 32 along with index information, block 300 of FIG. 3. The index information updates any index data 44 already stored at reception data storage. Alternatively, index data is parsed from the incoming data into a usable form. Regardless of whether index data 44 is a persistent value or just pulled from the signal, the information in index 44 is used to direct writing of the data word 32 into the slots 48 of reception data storage 16, block 310. In one embodiment, controller 52 is provided in reception data storage 16. In such an embodiment, controller 52 takes the form of state logic embedded in data storage 16 (such as DRAM). Controller 52 illustratively interprets the index data and directs the placement of incoming words and the output of words.

Figure 9:
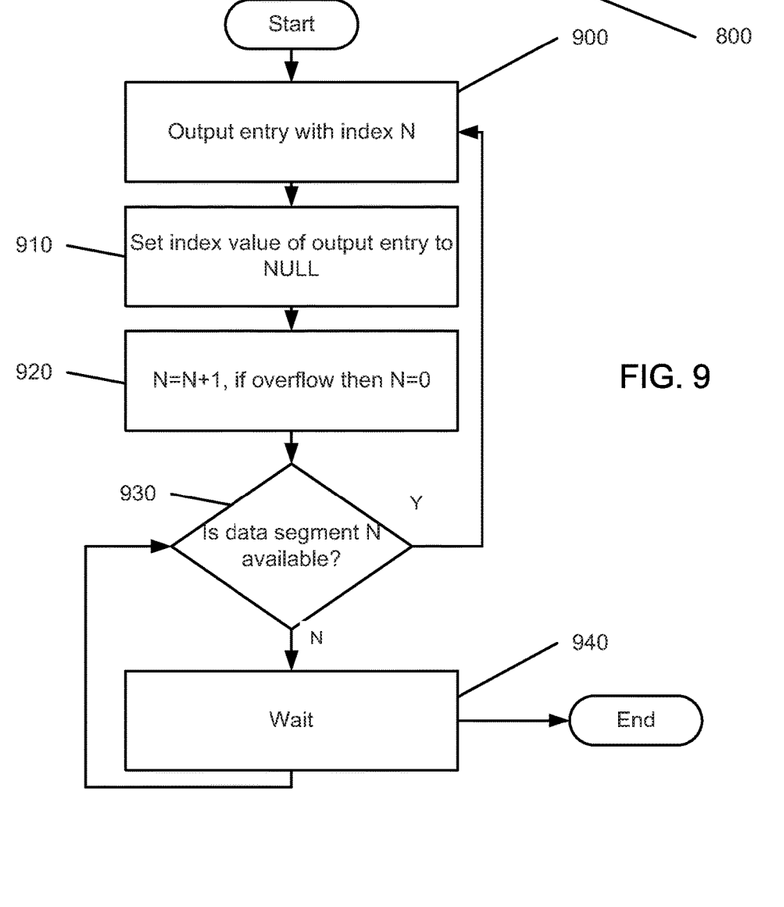
FIG. 9 is a flowchart showing an embodiment of operation of data reception in accordance with an embodiment of the present disclosure.

Data words 32 are then output via output 50 in the correct order. In one embodiment, output 50 includes state logic (such as controller 52 or otherwise) that is able to interpret index 44 to control output of data words 32. In another embodiment, state logic is provided that interprets index 44 to place data words 32 in proper slots 48 for natural operation of output 50. A first data word 32 is output, block 900 of FIG. 9. The index value associated with the output data word 32 is then erased or set to null, block 910. The data word 32 is thereby not able to be called to be output again. Similarly, the index value used for the first data word 32 is able to be re-assigned. Reception data storage 16, via controller 52 and counter 54 or otherwise, then increments the index value that is due to be next output, block 920. In this embodiment, there only need to be enough index values to uniquely address each slot in reception data storage 16. Accordingly, reception index 44 values can be re-used. When counter 54 used for reception index 44 values reaches an overflow state, it is reset to zero, block 920. Reception controller 52 then inquires as to whether the next data word 32 to be output is present in reception data storage 16, block 930. If the requested data word 32 is present, that data word 32 is output, block 900. If the requested data word 32 is not present, then output 50 waits, block 940, and checks again later, block 930.

Figure 6:
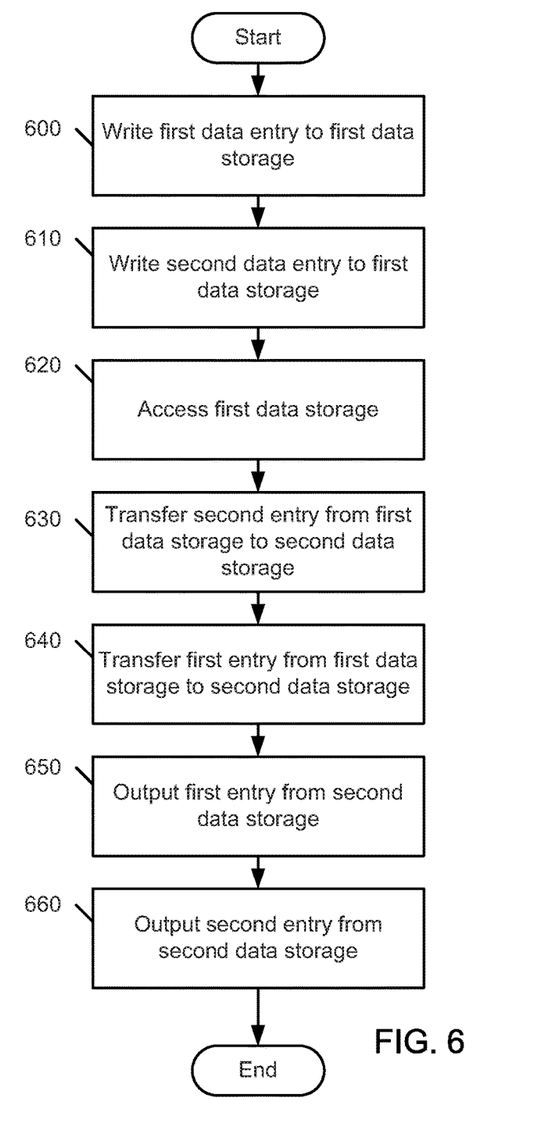
FIG. 6 is a flowchart showing another embodiment of operation of data transmission and reception in accordance with an embodiment of the present disclosure.

As previously mentioned, the overall system provides for first-in, first-out functionality with respect to input 18 and output 50. However, internally, when efficient, a first data word 32 that arrives at input 18 later than a second data word 32 will actually arrive at reception data storage 16 earlier than the second data word 32. Such a case is shown in FIG.

6. In the above described case, a first data word 32 arrives at input 18 and is written into source data storage 20, block 600. A second data word 32 subsequently arrives at input 18 and is written into source data storage 20, block 610. The source data storage 20 having the first and second data words 32 is then accessed, block 620. The second data word 32 is then transferred from the source data storage 20 to the reception data storage 16, block 630. Subsequently, the first data word 32 is transferred from the source data storage 20 to the reception data storage 16, block 640. Ultimately, the first data word 32 is output from output 50, block 650, before the second data word 32 is output from output, block 660.

Having described the pieces and methods, attention will now be directed to examples of data words 32, their transmission, and conservation of toggles and power made possible by the present disclosure.

Figure 8A:
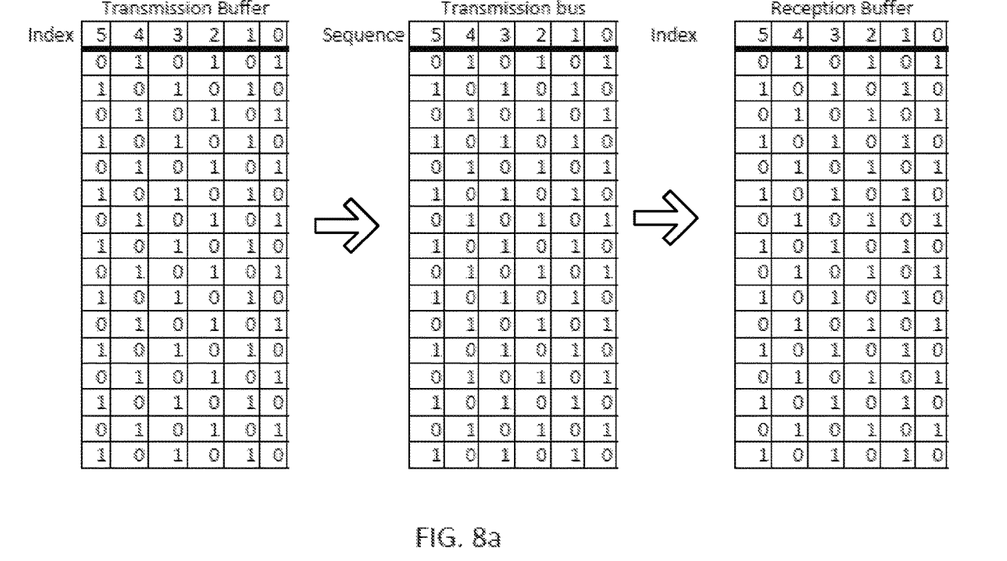
FIG. 8a is an illustration of the transfer of data according to prior art systems.

FIG. 8*a* shows a traditional transmission setup where both transmission and reception buffers are FIFO buffers. The right hand columns, identified as index=0, (Word0) are the words received and output first by transmission buffer, transmitted over bus 14 first, and received and output by reception buffer first. For purposes of this and the rest of the examples, it will be assumed that the data word sent previous to the Word0 was the same as Word0. Accordingly, the introduction of Word0 requires no toggling. Transitioning from Word0 to Word1 requires toggling of all sixteen bits. Similarly, progression through Word2, Word3, Word4, and Word5 each require toggling of all sixteen bits. Thus, the transmission shown in FIG. 8*a* involves eighty toggles. (The use of bus inversion would reduce this toggling down to 5 toggles as only the inversion bit would need to be toggled between words. Indeed, the word sequence shown in FIG. 8*a* is the case where bus inversion is most useful).

Figure 8B:
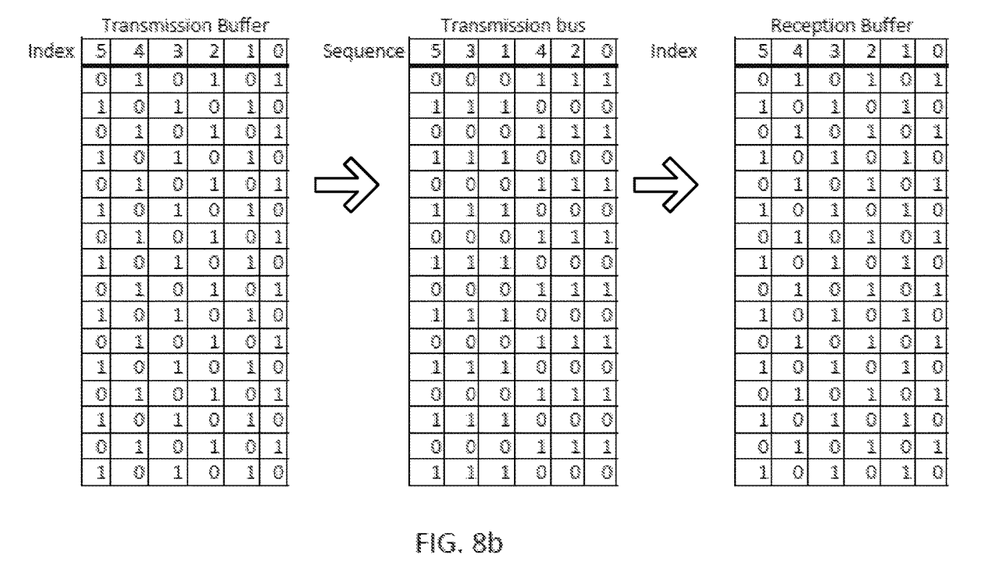
FIGS. 8b-c are illustrations of the transfer of data according to embodiments of the present disclosure.

The example shown in FIG. 8*b* shows the toggling savings that can be achieved through the teachings of the present disclosure (without also using bus inversion). In that the word before Word0 is assumed to be equal to Word0, each of Word0, Word2, and Word 4 are also equal to the word sent previous to Word0. Thus, each of Word0, Word2, and Word 4 has equal differences/similarities (no difference) to the previously sent word. In such a case, the word with the largest age is sent. Thus, Word0 is sent. Word0 requires no toggling. Similarly, Word2 and Word4 are then sent, each requiring no toggling. Accordingly, transmission to this point has required no toggling.

At this point, it should be mentioned that for purposes of these examples, additional words are not shown as being introduced into the source data storage 20 as words are transmitted. Rather, the example is being provided using the finite set of Words0-5.

After Word4 is sent, it is determined that each of Word1, Word3, and Word5 are equally different from Word4. Again, the word 32 with greatest age, Word1, is transmitted. This transmission requires toggling of all 16 bits. Word3 and Word 5 can subsequently be transmitted without toggling any bits. Thus, all words are transmitted by using only 16 toggles. When considering transmission of Words0-5 without using bus inversion, this presents a savings of 80% (80 toggles vs. 16 toggles).

Figure 8C:
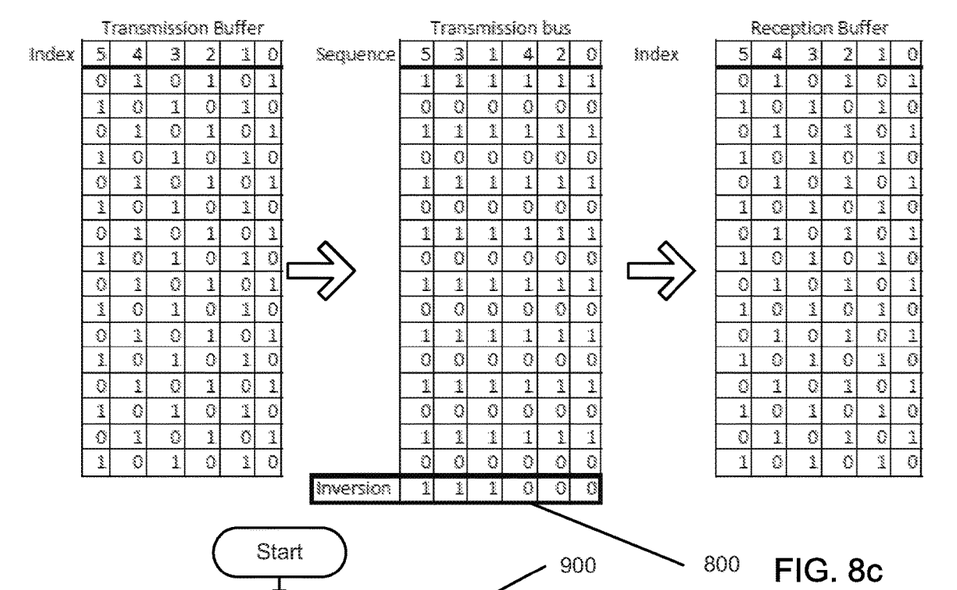

FIG. 8*c* presents the case of FIG. 8*b* with the addition of bus inversion. As shown, the only toggle needed is a single toggle on the inversion bit 800 during the switch from Word4 to Word1. Accordingly, this again presents a savings of 80% when bus inversion is used (5 toggles for bus inversion alone vs. 1 toggle for the present method combined with bus inversion).

It should be appreciated that while the concepts are described herein with respect to the embodiment of FIG. 1 that includes processor 12 that transmits data to reception data storage 16, embodiments are envisioned where data is transmitted within processor 12, between processors with on-board (on-chip) storage, between a processor and memory not located on-chip (such as DRAM), or otherwise. Furthermore, while the calculations regarding difference, age, and ID are described as being performed by processor 12, embodiments are envisioned where these calculations are performed by other entities, such as state logic or otherwise. More specifically, embodiments are envisioned in which the power savings are achieved for transfer of data from a data storage (such as DRAM) to a processor by embedding logic in the data storage. The data storage thus performs calculations and transmits data consistently with the teachings of this disclosure.

Still further, it should be appreciated that while the concepts described herein are described in terms of data transfer occurring within a computing device, embodiments are envisioned where the concepts are applied to data being output from computing device 10. Indeed, the concepts can find utility in digital signal transmission generally.

The above device and methods provide reduced power consumption and also provide reduced electromagnetic interference. Still further, the transfer of data out of order provides a type of data "scrambling." Thus, some added security to the data is provided. It thereby becomes more difficult for an individual to monitor power draws or the signal itself and ascertain the data therein.

The software operations described herein can be implemented in hardware such as discrete logic fixed function circuits including but not limited to state machines, field programmable gate arrays, application-specific circuits or other suitable hardware. The hardware may be represented in executable code stored in non-transitory memory such as RAM, ROM or other suitable memory in hardware descriptor languages such as, but not limited to, RTL and VHDL or any other suitable format. The executable code when executed may cause an integrated fabrication system to fabricate an IC with the operations described herein.

Also, integrated circuit design systems/integrated fabrication systems (e.g., work stations including, as known in the art, one or more processors, associated memory in communication via one or more buses or other suitable interconnect and other known peripherals) are known that create wafers with integrated circuits based on executable instructions stored on a computer-readable medium such as, but not limited to, CDROM, RAM, other forms of ROM, hard drives, distributed memory, etc. The instructions may be represented by any suitable language such as, but not limited to, hardware descriptor language (HDL), Verilog or other suitable language. As such, the logic, circuits, and structure described herein may also be produced as integrated circuits by such systems using the computer-readable medium with instructions stored therein. For example, an integrated circuit with the aforedescribed software, logic and structure may be created using such integrated circuit fabrication systems. In such a system, the computer readable medium stores instructions executable by one or more integrated circuit design systems that cause the one or more integrated circuit design systems to produce an integrated circuit.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic capable of producing the same effect are also contemplated.

What is claimed is:

1. A method of receiving data including:
   receiving, by a controller, a first data entry and a second data entry of a set of data entries from a first buffer in a first order such that the second data entry is received before the first data entry at least partially due to the similarity between the first and second entries, wherein the first entry was written to the first buffer before the second entry was written to the first buffer,
   receiving, by the controller, at least one index along with the first data entry and the second data entry, and
   writing, by the controller, the first data entry to a first slot in a second buffer in a second order and the second data entry to a second slot in the second buffer in the second order, the first slot and the second slot being identified by the at least one index.

2. The method of claim 1, the at least one index comprising a first index and a second index such that the first index identifies the first slot and the second index identifies the second slot.

3. The method of claim 2, further including:
   outputting, by an output, the first data entry from the second buffer in the second order relative to the second data entry, the second order being described by at least one of the first and second indexes.

4. The method of claim 2, wherein the second order is described by both the first and second indexes.

5. A data storage including:
   a plurality of data storage slots;
   a controller operable to:
      receive, from a buffer, a first data entry and a second data entry of a set of data entries in a first order such that the second data entry is received before the first data entry at least partially due to the similarity between the first and second entries, wherein the first entry was written to the buffer before the second entry was written to the buffer;
      receive an index; and
      place the first data entry into a first slot of the plurality of data storage slots and the second data entry into a second slot of the plurality of data storage slots, the first slot and the second slot being identified at least partially based on the index; and
   an output, operable to output data entries, including the first data entry and the second data entry, in a second order proscribed by the index.

6. The data storage of claim 5, wherein the data storage is DRAM.

7. The data storage of claim 5, wherein the controller includes state logic operable to receive the index and place the first data entry and the second data entry according to the index.

8. A system comprising:
   a transmission processor comprising a transmission controller operable to determine a first order of transfer for a set of data entries to be transferred that reduces an amount of power needed to complete the transfer, wherein the transmission controller is operable to:
      determine a first difference between a previously transferred data entry and the first data entry of the data entries to be transferred,
      determine a second difference between each of the data entries to be transferred and other data entries of the data entries to be transferred, and
      determine the first order of transfer based on the determined first and second differences such that the data entries to be transferred have the smallest difference relative to the previously transferred data entry; and
   a reception data storage comprising a reception controller and a buffer operable to store the data entries, wherein the reception controller is operable to:
      receive a first data entry and a second data entry of the data entries in the first order,
      receive at least one index along with the first data entry and the second data entry, and
      write the first data entry to a first slot in the buffer in a second order and the second data entry to a second slot in the buffer in the second order; the first slot and the second slot being identified by the at least one index.

9. The system of claim 8, the at least one index comprising a first index and a second index such that the first index identifies the first slot and the second index identifies the second slot.

10. The system of claim 9, wherein the reception data storage further comprises an output operable to output the first data entry from the buffer in the second order relative to the second data entry, the relative second order being described by at least one of the first and second indexes.

11. The system of claim 9, wherein the second order is described by both the first and second indexes.

12. The system of claim 8, wherein the transmission processor further comprises a transmitter operable to transmit the data entries in the first order.

13. The system of claim 8, wherein the transmission controller is further operable to determine if a second data entry has an age above a first threshold age.

14. The system of claim 13, wherein the transmission controller is further operable to determine the first order of transmission that will require a lowest amount of power to complete from those orders that successfully achieve transmission of the second data entry prior to the second data entry reaching a second threshold age.

15. The system of claim 8, wherein the first order requires a lowest amount of power to complete relative to other possible orders of transmission.

* * * * *